US008266492B2

(12) United States Patent
Gondo et al.

(10) Patent No.: US 8,266,492 B2
(45) Date of Patent: Sep. 11, 2012

(54) FEC TRANSMISSION PROCESSING APPARATUS AND METHOD AND PROGRAM RECORDING MEDIUM

(75) Inventors: Shunichi Gondo, Tokyo (JP); Yuji Irie, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 961 days.

(21) Appl. No.: 12/198,534

(22) Filed: Aug. 26, 2008

(65) Prior Publication Data

US 2009/0063928 A1 Mar. 5, 2009

(30) Foreign Application Priority Data

Sep. 3, 2007 (JP) ................................ 2007-227922

(51) Int. Cl.
*G06F 11/00* (2006.01)

(52) U.S. Cl. ...................................................... 714/751

(58) Field of Classification Search .................. 714/776, 714/751

See application file for complete search history.

(56) References Cited

U.S. PATENT DOCUMENTS 6,314,535 B1 * 11/2001 Morris et al. ................ 714/708
7,676,735 B2 * 3/2010 Luby et al. ................... 714/781
2004/0095950 A1 5/2004 Shirogane et al.
2005/0160346 A1 * 7/2005 Yamane ........................ 714/776
2006/0048036 A1 * 3/2006 Miura et al. .................. 714/758
2006/0280205 A1 * 12/2006 Cho ............................. 370/473
2008/0028276 A1 * 1/2008 Li et al. ......................... 714/752
2008/0065965 A1 * 3/2008 Hannuksela .................. 714/776
2008/0098284 A1 * 4/2008 Wolfgang et al. ............. 714/776
2008/0134005 A1 * 6/2008 Izzat et al. ..................... 714/774
2008/0222494 A1 * 9/2008 Gondo et al. ................. 714/776
2008/0253369 A1 * 10/2008 Oran et al. .................... 370/390
2008/0285476 A1 * 11/2008 Rajakarunanayake ........ 370/252
2009/0327842 A1 * 12/2009 Liu et al. ....................... 714/776
2010/0005360 A1 * 1/2010 Begen et al. .................. 714/751
2010/0050057 A1 * 2/2010 Luby ............................ 714/776
2010/0091801 A1 * 4/2010 Itakura et al. ................ 370/475
2010/0122127 A1 * 5/2010 Oliva et al. .................... 714/704

(Continued)

FOREIGN PATENT DOCUMENTS

JP 2001-86153 3/2001

(Continued)

OTHER PUBLICATIONS

Office Action issued Mar. 22, 2011, in China Patent Application No. 200810215020.5.

(Continued)

*Primary Examiner* — Bryce Bonzo

(74) *Attorney, Agent, or Firm* — Oblon, Spivak, McClelland, Maier & Neustadt, L.L.P.

(57) ABSTRACT

There is provided with an FEC transmission processing apparatus including: a media packet acquiring unit configured to successively acquire media packets from a media packet generator; a media packet transmission unit configured to transmit the media packets acquired to a media packet reception processing apparatus; an FEC packet generation unit configured to generate a plurality of FEC packets for the media packet reception processing apparatus to recover a lost media packet by carrying out FEC calculation processing using media packets acquired within a predetermined FEC period from acquisition of a first acquired media packet after media packets subjected to the FEC calculation processing immediately before; and an FEC packet transmission unit configured to transmit the FEC packets to the media packet reception processing apparatus within the predetermined FEC period after a lapse of the predetermined FEC period from the acquisition of the first acquired media packet.

8 Claims, 10 Drawing Sheets

U.S. PATENT DOCUMENTS

2010/0202309 A1* 8/2010 Suneya ......................... 370/252
2011/0231727 A1* 9/2011 Kure et al. .................... 714/751

FOREIGN PATENT DOCUMENTS

| | | | |
|---|---|---|---|
| JP | 2004-32719 | | 1/2004 |
| JP | 2005-223433 | | 8/2005 |
| JP | 2006-67072 | | 3/2006 |
| JP | 2006-157525 | | 6/2006 |
| WO | WO 2006/061902 | A1 | 6/2006 |

OTHER PUBLICATIONS

"Transmission of Professional MPEG-2 Transport Streams over IP Networks", Pro-MPEG Code of Practice #3 release 2, Jul. 2004, pp. 1-17.

Office Action issued Jan. 24, 2012 in Japanese Patent Application No. 2007-227922 (English translation only).

* cited by examiner

FEC TRANSMISSION PROCESSING APPARATUS AND METHOD AND PROGRAM RECORDING MEDIUM

CROSS REFERENCE TO RELATED APPLICATIONS

This application is based upon and claims the benefit of priority from the prior Japanese Patent Applications No. 2007-227922, filed on Sep. 3, 2007; the entire contents of which are incorporated herein by reference.

BACKGROUND OF THE INVENTION

1. Field of the Invention

The present invention relates to an FEC transmission processing apparatus, a FEC transmission method and a program recording medium.

2. Related Art

RTP (Real-time Transport Protocol) is a communication protocol capable of transfer additional information such as sequence and processing timing together on a data packet being delivered. When the receiving side executes reception processing based on the additional information, the received data packet (media packet) thereby reproduces the same condition as that at the time of transmission regardless of influences of disturbance received during delivery. However, while RTP can recover changes in the sequence and variations in received intervals, RTP can only detect but not recover losses.

In real-time streaming of video, speech or the like, data loss may cause reproduction quality of video or speech to degrade, and therefore it is preferable to take appropriate recovery measures. Examples of such general techniques include one using retransmission and one using error-correcting codes.

One of the simplest recovery measures is a technique of requesting retransmission when packet loss occurs, but the use of the technique is not always appropriate in real-time streaming communication. Causes of this include that keeping constant data delivery for the application layer requires data before and after retransmission data to be retained until the retransmission data is received, and a large delay is produced when the propagation time is long, or that reliable reception of even retransmission data may not be guaranteed in a channel where losses occur. Furthermore, when feedback is not possible on the receiving side in the case of one-directional communication such as broadcasting type delivery, retransmission cannot be requested in the first place.

On the other hand, a technique using error-correcting codes is available and a recovery measure using FEC (Forward Error Correction) coded communication is known as a practical technique. FEC groups original data (calculation unit), carries out calculations using a predetermined technique, generates redundant data for each group, stores the redundant data in FEC packet and transmits the FEC packets in parallel with the original data. When part of the original data is lost in each group, the receiving side carries out calculations from the redundant data corresponding to the rest of the original data using a predetermined technique and can thereby recover the lost original data. In this case, since the redundant data and original data are transmitted with very short or substantially no delay, the receiving side can immediately recover the data and delays caused by the processing become smaller than those for retransmission.

Conventionally, one of general FEC schemes applicable to RTP is a scheme defined in RFC2733. Furthermore, there is a scheme defined by the Pro-MPEG forum whereby this scheme is improved for video streaming communication ("Pro-MPEG Code of Practice #3 release 2", Pro-MPEG Forum, July 2004). This scheme is intended to improve the recovery performance against a plurality of consecutive losses taking into consideration a phenomenon that even a degree of disturbance that produces at most one loss at low rate when the rate is high may produce a plurality of consecutive losses. More specifically, a plurality of data packets are arranged on a matrix, the data packets are then grouped for each columns & rows, subjected to FEC coding and FEC packets are thereby generated from each group. In this case, each row and each column become one group (calculation unit) of FEC, and therefore consecutive losses over a certain one horizontal row can be processed as at most one loss in each of a plurality of longitudinal column groups.

Here, the FEC scheme of Pro-MPEG defines transmission of a plurality of FEC packets for a coding block (matrix) as packets to be transmitted within a range in which the next matrix is transmitted. That is, the receiving side requires a delay and wait corresponding to one matrix until an FEC packet is received, but this delay time is extremely small when the rate is high and is insignificant compared to other schemes. Furthermore, it can be expected to avoid the two packets (both fec packet and corresponding data packet) from simultaneously being lost due to disturbance during delivery because of a transmission difference between the data packet and FEC packet and there are great advantages such that coding can be realized during transmission without retention of any data packet, thus preventing delays and the transmission rate of FEC packets can be easily smoothed to a constant value. If the FEC packet transmission range is not preserved, the transmission rate of the FEC packet may increase more than expected even temporarily, causing problems in transmission on a network which is restricted with bandwidth reservations. In this case, FEC packets exceeding the reserved bandwidth are discarded or the rate thereof is forcibly reduced, which produces problems such as a delay that occurs as a whole, preventing the reception apparatus from carrying out FEC coding processing normally.

In this way, though it can be said to be a reasonable FEC packet transmission rule from an overall standpoint, the Pro-MPEG FEC scheme is only targeted at streams at a constant rate (CBR: Constant Bit Rate) and not targeted at streams at a variable rate (VBR). Therefore, there has been no FEC scheme that would satisfy the FEC packet transmission range and its transmission rate restriction simultaneously and efficiently form a matrix in streams at a variable rate (VBR: Variable Bit Rate).

SUMMARY OF THE INVENTION

According to an aspect of the present invention, there is provided with an FEC transmission processing apparatus comprising:

a connecting unit configured to connect to a media packet generator that generates media packets;

a media packet acquiring unit configured to successively acquire the media packets from the media packet generator;

a media packet transmission unit configured to transmit the media packets acquired by the media packet acquiring unit to a media packet reception processing apparatus that receives and processes the media packets over a network;

an FEC packet generation unit configured to generate a plurality of FEC packets for the media packet reception processing apparatus to recover a lost media packet by carrying out FEC calculation processing using media packets acquired within a predetermined FEC period from acquisition of a first acquired media packet after media packets subjected to the FEC calculation processing immediately before; and an FEC packet transmission unit configured to transmit the FEC packets to the media packet reception processing apparatus within the predetermined FEC period after a lapse of the predetermined FEC period from the acquisition of the first acquired media packet.

According to an aspect of the present invention, there is provided with an FEC transmission processing method comprising:

connecting to a media packet generator that generates media packets;

acquiring the media packets from the media packet generator successively;

transmitting the media packets acquired to a media packet reception processing apparatus that receives and processes the media packets over a network;

generating a plurality of FEC packets for the media packet reception processing apparatus to recover a lost media packet by carrying out FEC calculation processing using media packets acquired within a predetermined FEC period from acquisition of a first acquired media packet after media packets subjected to the FEC calculation processing immediately before; and transmitting the FEC packets to the media packet reception processing apparatus within the predetermined FEC period after a lapse of the predetermined FEC period from the acquisition of the first acquired media packet.

According to an aspect of the present invention, there is provided with a program recording medium storing a computer program for causing a computer to execute instructions to perform the steps of:

connecting to a media packet generator that generates media packets;

acquiring the media packets from the media packet generator successively;

transmitting the media packets acquired to a media packet reception processing apparatus that receives and processes the media packets over a network;

generating a plurality of FEC packets to recover a lost media packet in the media packet reception processing apparatus by carrying out FEC calculation processing using media packets acquired within a predetermined FEC period from acquisition of a first acquired media packet after media packets subjected to the media packet reception processing apparatus immediately before; and transmitting the FEC packets to the media packet reception processing apparatus within the predetermined FEC period after a lapse of the predetermined FEC period from the acquisition of the first acquired media packet.

DETAILED DESCRIPTION OF THE INVENTION

Figure 1:
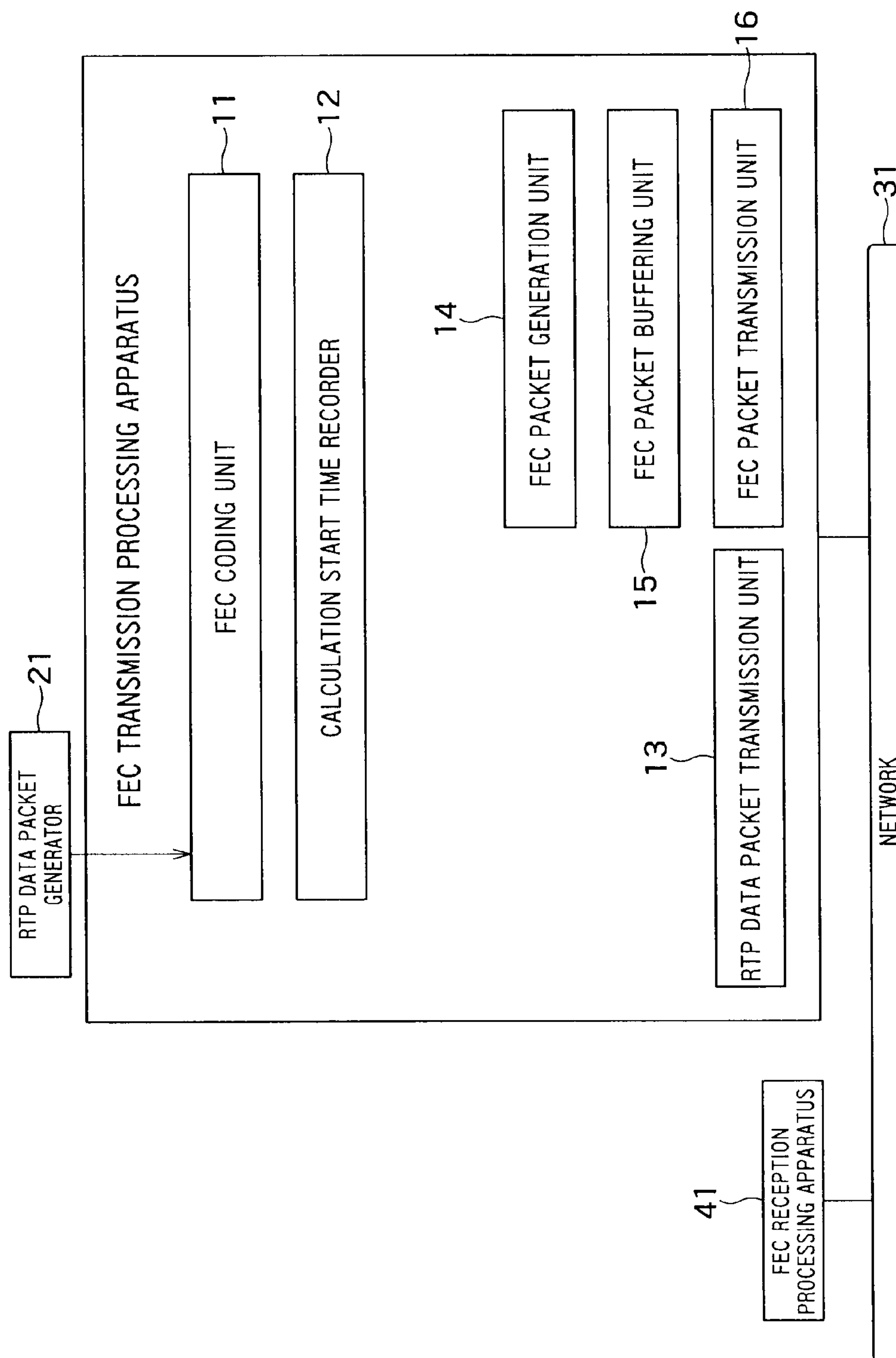
FIG. 1 is a block diagram showing the configuration of an FEC transmission processing apparatus according to a first embodiment.

The technical background against which the present inventors have come to conceive the present invention will be explained.

As has been described in "Related Art," the FEC (Forward Error Correction) scheme of Pro-MPEG only targets at streams with a constant rate (CBR: Constant Bit Rate) and does not target at streams at a variable rate (VBR: Variable Bit Rate). One of reasons thereof is that conditions applicable at a constant rate are not applicable at a variable rate under an FEC scheme whereby a matrix is formed. That is, when the data rate fluctuates, the following problems occur in measures and methods normally available.

When the data rate fluctuates, suppose the number of data packets making up each matrix is kept constant. In this case, since the time period required for coding varies from one matrix to another consequently, the time period corresponding to the transmission range of an FEC packet also fluctuates and the transmission rate of the FEC packet does not become constant. In this case, unless the receiving side sets a coding period corresponding to the transmission range in the case of a minimum rate, that is, a maximum coding period as a delay time, data packets are exhausted (underflow) in reception processing. For this reason, part of the data may cause the delay time required for FEC processing related to all data to become excessively long. When the transmission rate of the FEC packet is simply smoothed, if the rate is higher than an estimated rate, the FEC packets are transmitted at a low rate, and therefore the delay time may be further extended and may become even unpredictable.

On the other hand, there is a method of keeping the number of data packets made up of all matrixes constant by making up for missing data packets with padding data or the like. In the case of digital broadcasting, for example, since transmission needs to be carried out at a constant rate by radio, streams may be transmitted with the original variable rate changed to a constant rate using a NULL-TS packet which is equivalent to padding. When streams are transmitted on an IP, consumption of useless bandwidth such as padding is not desirable from the standpoint of effective use of network bandwidth. For this reason, it is preferable to exclude unnecessary NULL-TS packets and transmit streams at a variable rate. When padding is applied to these variable streams, the rate becomes a constant rate which matches a maximum rate of the variable streams, and therefore the effect of excluding the NULL-TS packets is reduced and it is not possible to realize effective use of bandwidth.

As shown above, the number of data packets making up a matrix may be kept constant as in the case of the constant rate as the technique of applying the above described FEC scheme to the variable rate, but the application thereof is not realistic due to an extension of the delay time and wasteful consumption of bandwidth.

The present invention makes it possible to apply an FEC scheme for forming a matrix (FEC scheme for generating a plurality of FEC packets from one coding block) in the case of a variable rate without producing any such problem. Hereinafter, embodiments of the present invention will be explained.

(First Embodiment)

FIG. 1 is a block diagram showing the configuration of an FEC transmission processing apparatus according to a first embodiment of the present invention.

An FEC coding unit 11 successively acquires RTP data packets generated by an RTP data packet generator 21 which generates RTP data packets (media packets) at a variable rate (VBR). The FEC coding unit 11 successively performs FEC coding processing on RTP data packets acquired (inputted) within a predetermined fixed coding period (FEC period) α every time an RTP data packet is acquired. More specifically, the FEC coding unit 11 performs FEC coding processing on a plurality of RTP data packets acquired within the predetermined coding period α after acquiring the first acquired RTP data packet after an RTP data packets processed immediately before (the set of the plurality of RTP data packets is referred to as a "coding block," "matrix" or "media packet group") every time an RTP data packet is acquired. In this way, a plurality of pieces of redundant data are generated from one coding block. Furthermore, every time the FEC coding unit 11 acquires an RTP data packet or carries out FEC coding processing on the RTP data packet, it passes the RTP data packet to the RTP data packet transmission unit 13. The RTP data packet may be directly passed from the RTP data packet generator 21 to an RTP data packet transmission unit 13 without passing through the FEC coding unit 11.

Here, the RTP data packet includes media data, sequence number, time stamp or the like to be reproduced by an FEC reception processing apparatus 41 on the receiving side. The RTP data packet generator 21 may be included in the same apparatus as the FEC transmission processing apparatus or may be included in an apparatus different from the FEC transmission processing apparatus.

The RTP data packet transmission unit 13 transmits the RTP data packet passed from the FEC coding processing unit to the FEC reception processing apparatus 41 which performs reception processing on the RTP data packet through a network 31.

An FEC packet generation unit 14 generates an FEC packet including the redundant data generated by the FEC coding unit 11 and information or the like for identifying the RTP data packet based on which the redundant data was generated for each piece of the redundant data generated (FEC packet generation processing). That is, the FEC packet generation unit 14 generates the same number of FEC packets as the pieces of redundant data. The FEC packet is intended to recover the lost media packet lost on the network 31 or the like at the FEC reception processing apparatus (media packet reception processing apparatus) 41. Suppose the FEC coding processing and the FEC packet generation processing are collectively called "FEC calculation processing."

An FEC packet buffering unit 15 buffers the FEC packet generated by the FEC packet generation unit 14.

A calculation start time recorder 12 records a time (calculation start time) T at which the first acquired RTP data packet in the coding block (matrix) is acquired.

Figure 5:
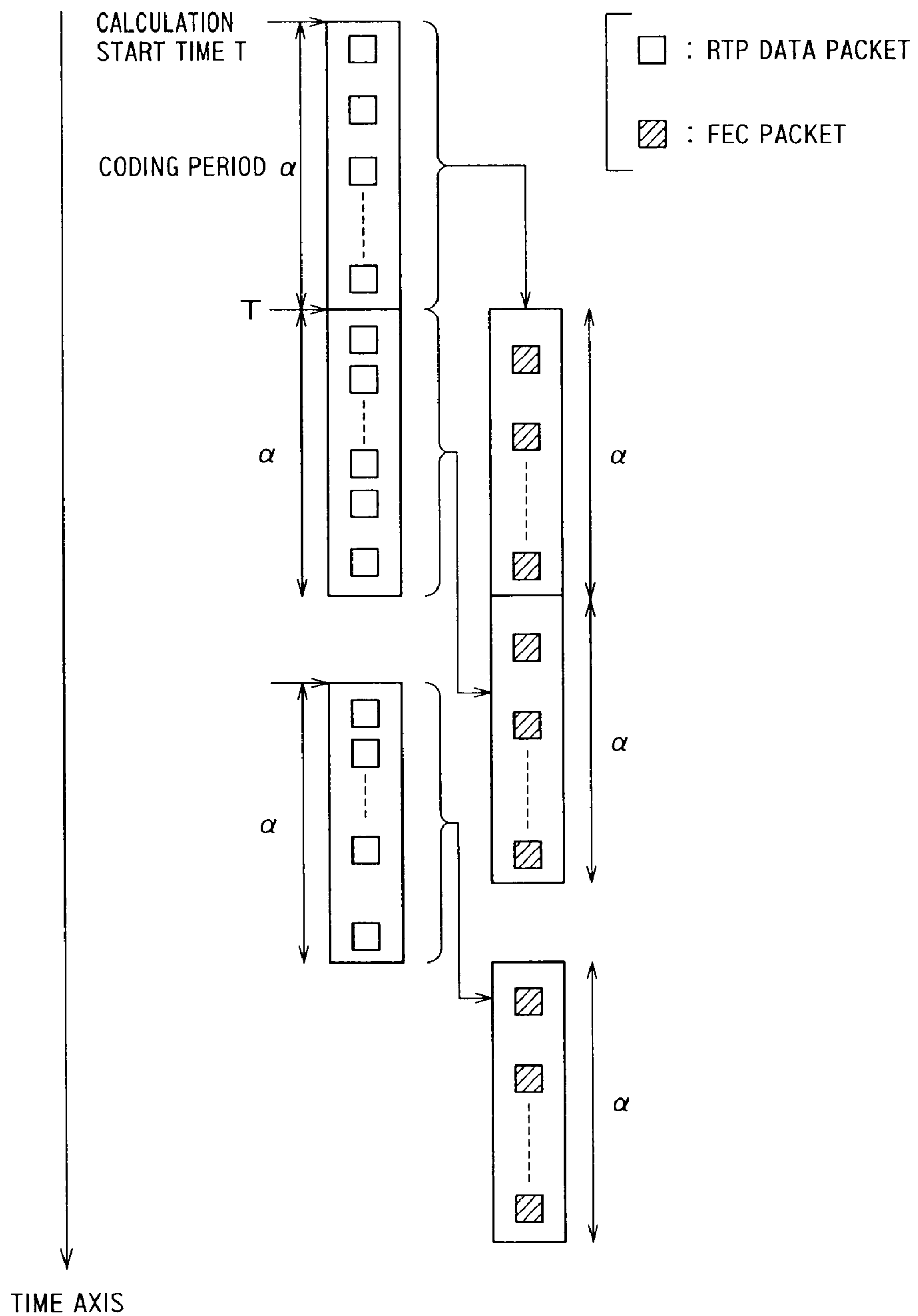
FIG. 5 shows how FEC packets are generated and transmitted for each coding block.

An FEC packet transmission unit 16 distributes the plurality of FEC packets generated for the coding block within the coding period α from a time calculated by adding the coding period α to the time (calculation start time) T of the first acquired media packet in this coding block and transmits the plurality of FEC packets to the FEC reception processing apparatus 41. That is, the FEC packet transmission unit 16 transmits the FEC packet within the coding period α after a lapse of the coding period α from the acquisition of the first media packet. FIG. 5 shows an example of how FEC packets are generated and transmitted for each coding block. Coding processing is performed by multiplying each coding block by the coding period α and FEC packets are distributed and transmitted within the coding period α after a lapse of the coding period α from the calculation start time T.

Figure 2:
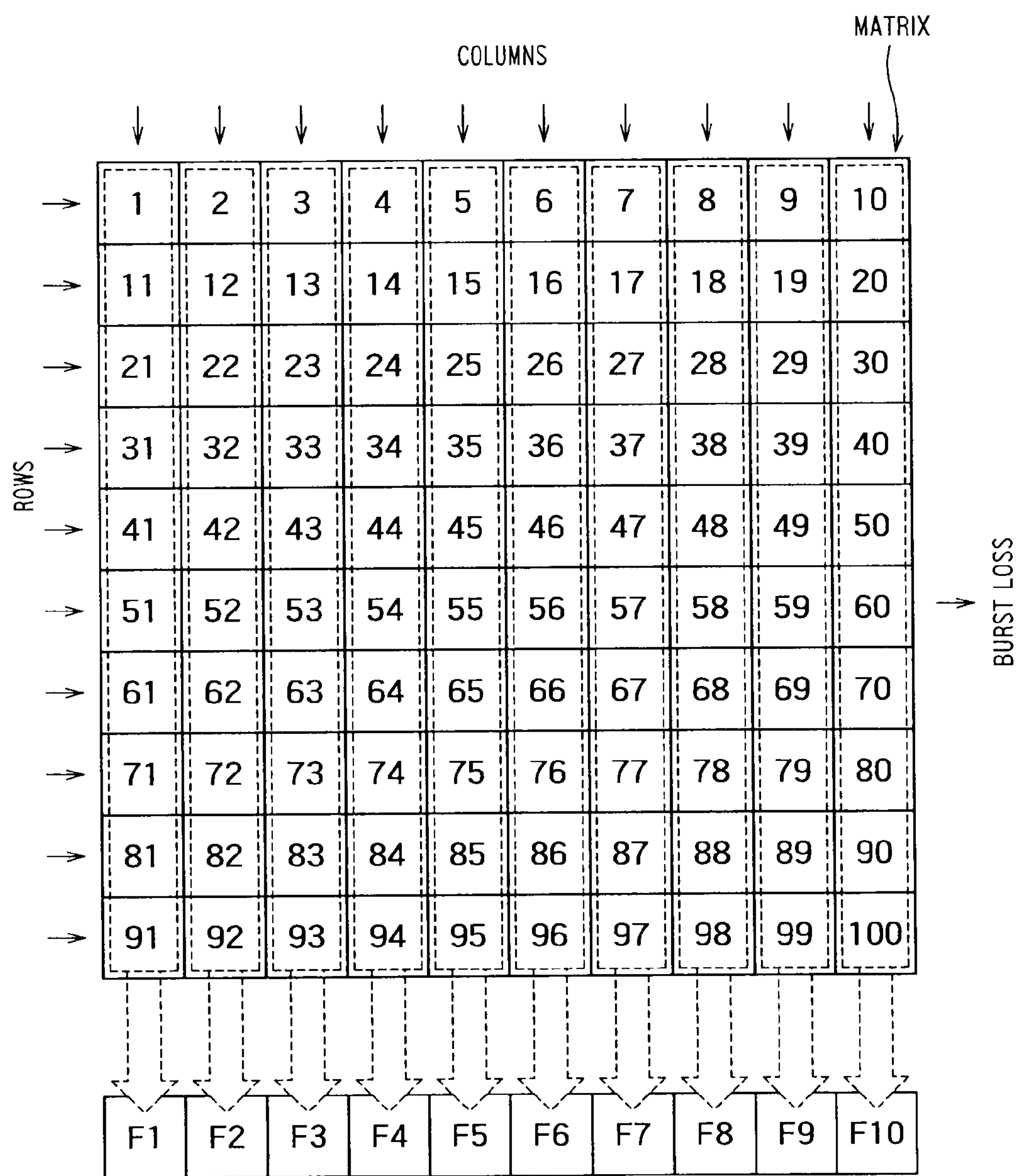
FIG. 2 illustrates an example of FEC calculation processing (FEC coding processing and FEC packet generation processing)

FIG. 2 illustrates an example of FEC calculation processing (FEC coding processing and FEC packet generation processing).

An example of using 100 packets (coding blocks) is shown here. The FEC coding unit 11 forms a matrix by arranging these RTP data packets in a square shape and forms a horizontal group of 10 rows and a longitudinal group of 10 columns. The FEC coding unit 11 performs a computation using RTP data packets (here XOR) for each longitudinal group (calculation unit) to calculate redundant data. The FEC packet generation unit 14 generates FEC packets F1 to F10 using the redundant data calculated from each longitudinal group. The FEC packet includes redundant data, information identifying the RTP data packet which is the source of generating the redundant data (RTP data packet in the longitudinal group corresponding to the redundant data) and sequence numbers of sequences different from the RTP data packets or the like. For example, the FEC packet F1 includes redundant data and information identifying RTP data packets 1, 11, 21, 31, . . . , 81, 91 associated with this redundant data or the like. Suppose this embodiment generates redundant data and FEC packets only from the longitudinal group, but it is also possible to generate redundant data and FEC packets from the horizontal group in addition to the longitudinal group.

Figure 3:
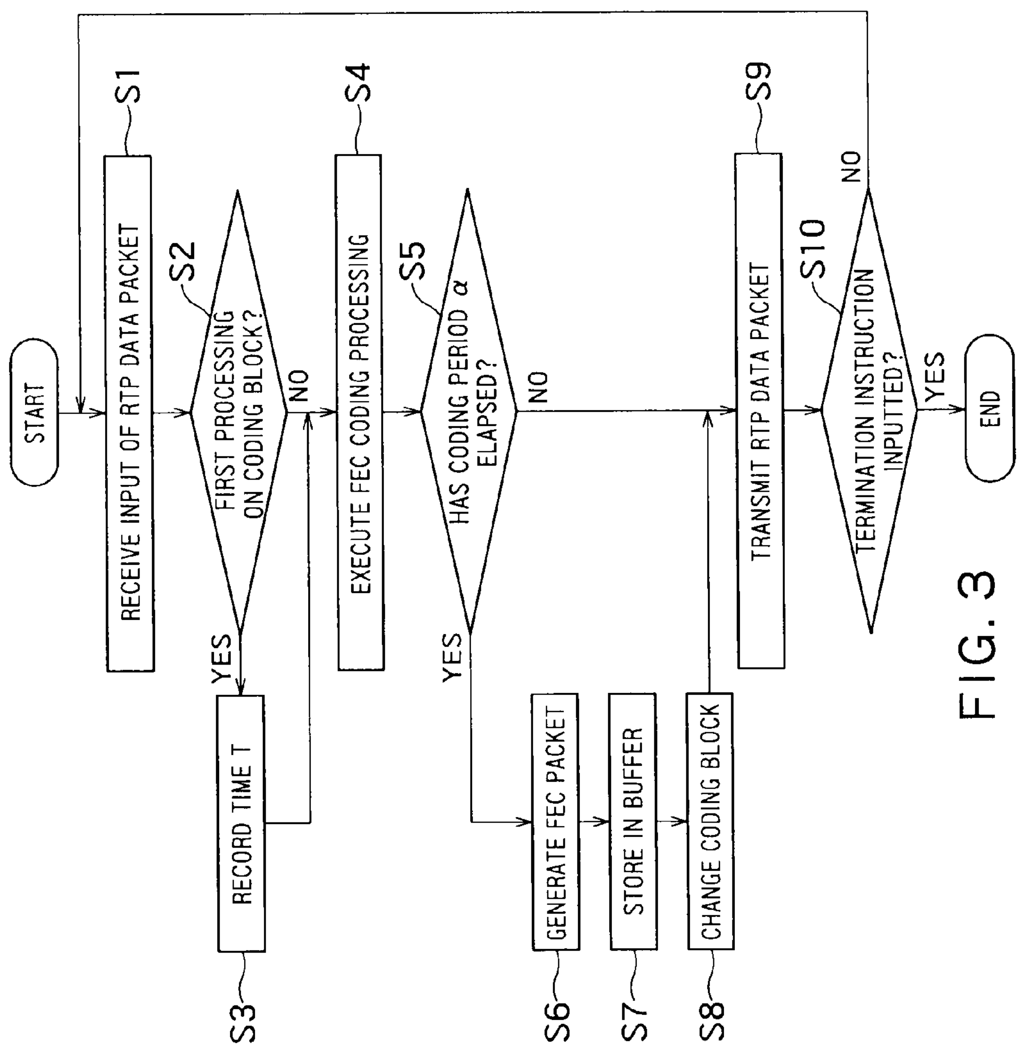
FIG. 3 is a flowchart showing an operation example of the FEC transmission processing apparatus in FIG. 1.
Figure 4:
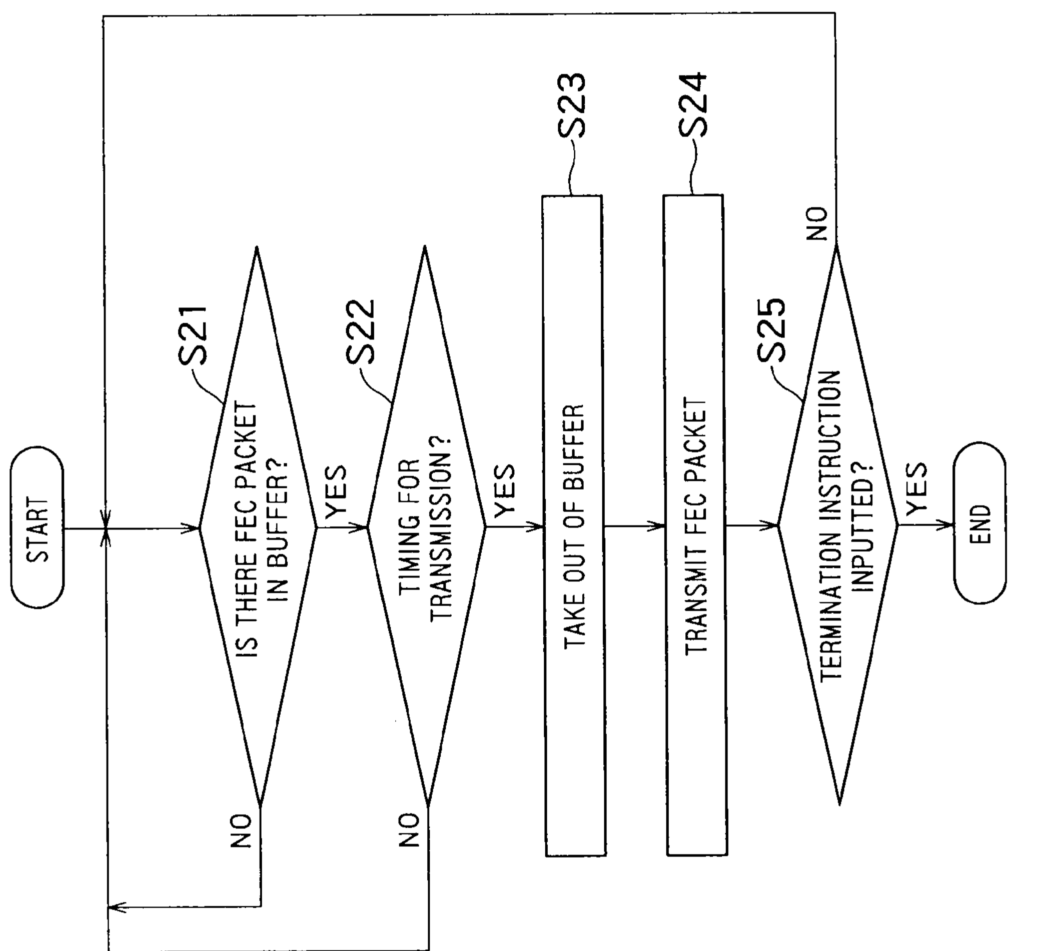
FIG. 4 is a flowchart illustrating an operation example of an FEC packet transmission unit in the FEC transmission processing apparatus.

FIG. 3 is a flowchart showing an operation example of the FEC transmission processing apparatus in FIG. 1. FIG. 4 is a flowchart illustrating an operation example of the FEC packet transmission unit 16 of the FEC transmission processing apparatus in particular.

In FIG. 3, the FEC coding unit 11 receives input of an RTP data packet from the RTP data packet generator 21 and temporarily records the received RTP data packet (S1).

Next, when the acquired RTP data packet corresponds to the first coding block (YES in S2), the FEC coding unit 11 causes the calculation start time recorder 12 to record the time at which the RTP data packet is received (calculation start time) T (S3). When the acquired RTP data packet does not correspond to the first coding block (NO in S2), the process moves to step S4 without carrying out step S3.

The FEC coding unit 11 executes FEC coding processing using the received RTP data packet (S4). In the example of FIG. 2 presented above, when the received RTP data packet is the start of the longitudinal block, the RTP data packet is stored in step S4. When the RTP data packet is the second from the start of the longitudinal block, a calculated value is obtained through a calculation (e.g., XOR) with the first RTP data packet. When the RTP data packet is the third from the start of the longitudinal block, a calculation (e.g., XOR) with the calculated value obtained from the first and second RTP data packets is carried out. In this way, the FEC coding unit 11 carries out FEC coding processing every time it receives an RTP data packet.

The FEC coding unit 11 judges whether or not a predetermined coding period $\alpha$ has elapsed from the calculation start time T of the first acquired RTP data packet about the corresponding coding block (S5).

When the coding period $\alpha$ from the calculation start time T has not elapsed (NO in S5), the process moves to step S9.

On the other hand, when the coding period $\alpha$ from the calculation start time T has elapsed (YES in S5), the FEC packet generation unit 14 generates a plurality of FEC packets using a plurality of pieces of redundant data obtained through the FEC coding processing in step S4 and the identifier of the RTP data packet which is the source of generating the plurality of pieces of redundant data or the like (S6).

The FEC packet buffering unit 15 buffers the plurality of FEC packets generated by the FEC packet generation unit 14 until they are actually transmitted (S7).

The FEC coding unit 11 changes the configuration so that the process is moved to the next coding block (the next inputted RTP data packet is handled as the first RTP data packet of the coding block) (S8).

The RTP data packet transmission unit 13 transmits the RTP data packet inputted in step S1 (S9). Transmission of this RTP data packet may also be performed immediately after step S4.

Whether or not a termination instruction has been inputted (S10) is judged and if not inputted (NO in S10), the process returns to step S1 and if inputted (YES in S10), the processing is terminated.

In FIG. 4, when an FEC packet is found in the FEC packet buffering unit 15 (YES in S21), if the current time is transmission timing (YES in S22), the FEC packet transmission unit 16 extracts the FEC packet from the FEC packet buffering unit 15 (S23) and transmits the extracted FEC packet (S24).

The transmission timing in this case is determined, for example, by calculation start time T+coding period $\alpha$+coding period $\alpha\times$(number of packets from the start in the corresponding coding block/total number of packets in the corresponding coding block). Alternatively, transmission is carried out at predetermined timing from calculation start time T+coding period $\alpha$ within the coding period $\alpha$ from calculation start time T+coding period $\alpha$.

The transmission flow of the FEC packet in FIG. 4 is invoked periodically or after step S9 or S10 in FIG. 3.

In this way, this embodiment keeps constant the coding period (FEC period) with respect to each coding block (matrix) and transmits the FEC packet within the coding period $\alpha$ after the coding period $\alpha$ from the time at which the first RTP data packet in the coding block is acquired, and can thereby transmit the FEC packet without producing delays as much as possible even in the case of a variable rate and also prevent transmissions of FEC packets from overlapping among coding blocks (see FIG. 5).

(Second Embodiment)

The first embodiment keeps constant the coding period with respect to each matrix, and therefore the number of RTP data packets may vary from one matrix to another. For this reason, depending on the length of the coding period, a number of RTP data packets exceeding a maximum number of RTP data packets that can be subjected to FEC coding processing (maximum number of RTP data packets that can be included in one matrix) may also be inputted.

Therefore, when the RTP data packet transmission unit 13 transmits an RTP data packet at a maximum transmission rate (RTP data packet generator 21 generates an RTP data packet at a maximum rate), this embodiment sets a period (minimum coding period) required to input (acquire) a maximum number (specified number) of RTP data packets of the RTP data packet that can be subjected to FEC coding processing as a coding period $\alpha$. This makes it possible to prevent more than a maximum number of RTP data packets from being acquired within the coding period $\alpha$.

(Third Embodiment)

This embodiment solves the problems of the first embodiment using a technique (first scheme and second scheme) different from that of the second embodiment.

(First scheme) When a maximum number (or specified number; hereinafter unified as "maximum number") of RTP data packets that can be included in one coding block are acquired, a plurality of FEC packets are generated from among the maximum number of acquired RTP data packets without waiting for the coding period $\alpha$ to elapse when the RTP data packets are acquired. The plurality of FEC packets generated are distributed and transmitted within the coding period $\alpha$ from the time at which the maximum number of RTP data packets are acquired, that is, the time calculated by adding the period required to acquire the RTP data packets (coding processing) (elapsed period) $\beta$ to the calculation start time T of the first inputted RTP data packet in the coding block. When the maximum number of RTP data packets are not acquired within the coding period $\alpha$, FEC packets are generated using the RTP data packets acquired within the coding period $\alpha$ as in the case of the first embodiment, and the FEC packets generated are distributed and transmitted within the next coding period $\alpha$. Therefore, in this scheme, the transmission timing of the FEC packets will be as follows.

The transmission timing is determined by calculation start time T+elapsed period $\beta$+coding period $\alpha\times$(number of packets from the start in the corresponding coding block/total number of packets in the corresponding coding block). Alternatively, the FEC packets are transmitted at predetermined fixed timing from the start time T+elapsed period $\beta$ for the $\alpha$. Here, the elapsed period $\beta$ is the time period required to acquire the maximum number of RTP data packets or the coding period $\alpha$ and reaches a maximum value when it matches the coding period $\alpha$ (e.g., when the maximum number of RTP data packets are not acquired within the coding period $\alpha$).

Figure 6:
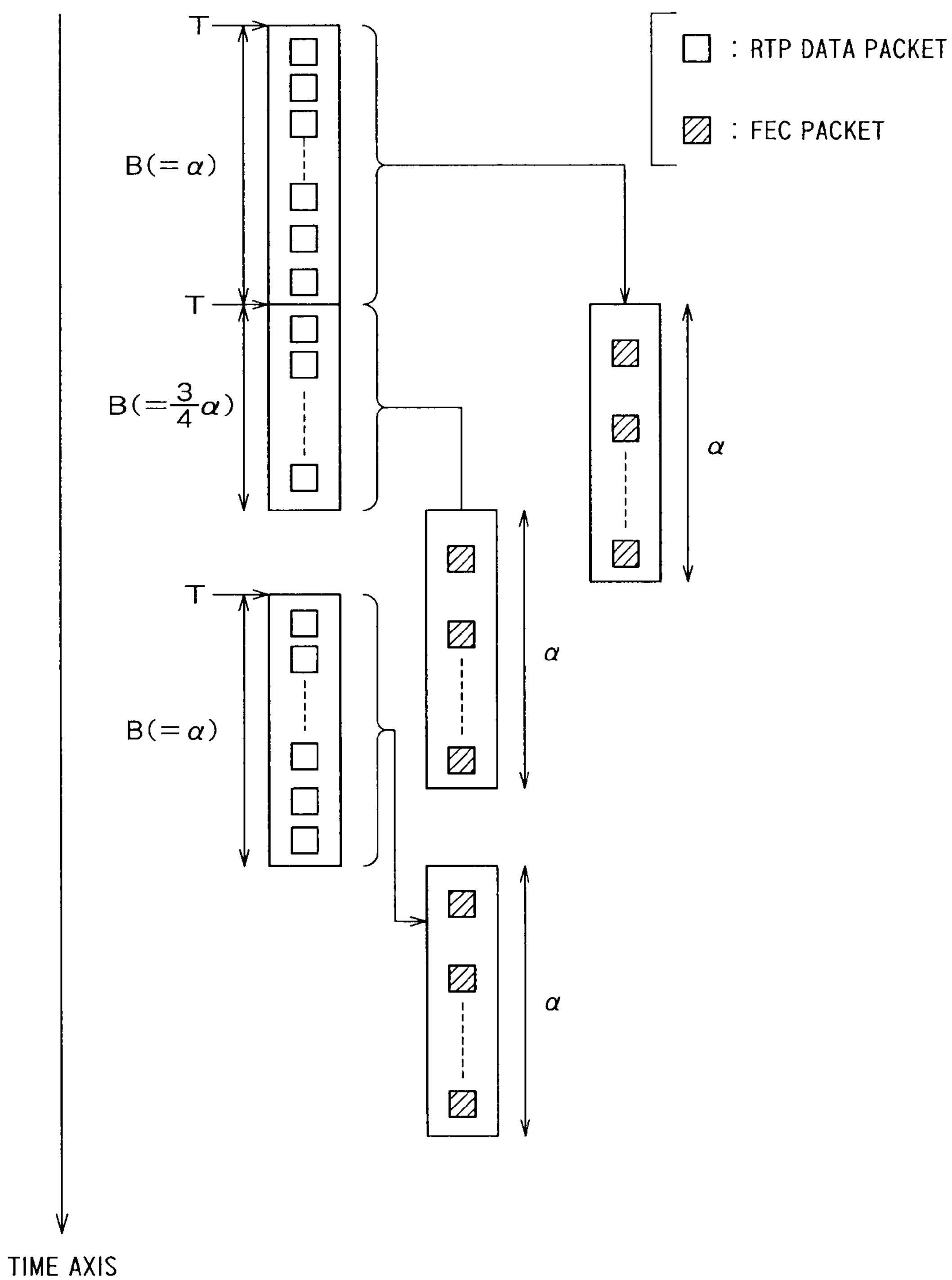
FIG. 6 shows how FEC packets are generated and transmitted by applying a first scheme according to a third embodiment.

FIG. 6 shows how FEC packets are generated and transmitted by applying this scheme. Here an example is shown where since a maximum number of RTP data packets are acquired in $3\alpha/4$ (=$\beta$) which is shorten than the coding period $\alpha$ with respect to the second coding block from the top, FEC packets are generated from the RTP data, distributed within the coding period $\alpha$ from a time (T+$3\alpha/4$) and the FEC packets generated are transmitted.

The present scheme eliminates the necessity for setting the coding period $\alpha$ to a minimum coding period as in the case of the second embodiment and can thereby prevent, when the rate is reduced, redundancy of the FEC from becoming excessive.

(Second scheme) While the first scheme sets the time period for transmitting FEC packets to the coding period $\alpha$ from the calculation start time T+elapsed period $\beta$, the present scheme sets it to the elapsed period $\beta$ from the calculation start time T+elapsed period $\beta$. When the maximum number of RTP data packets are not acquired within the coding period $\alpha$, the transmission timing of FEC packets according to this scheme is as follows.

The transmission timing is determined by the start time T+elapsed period $\beta$+elapsed period $\beta\times$(the number of packets from the start in the corresponding coding block/total number of packets in the corresponding coding block). Alternatively, FEC packets are transmitted at predetermined timing from the start time T+elapsed period $\beta$ for the elapsed period $\beta$. Here, the elapsed period $\beta$ is the time required to acquire a maximum number of RTP data packets or the coding period $\alpha$ and reaches a maximum value when it matches the coding period $\alpha$.

Figure 7:
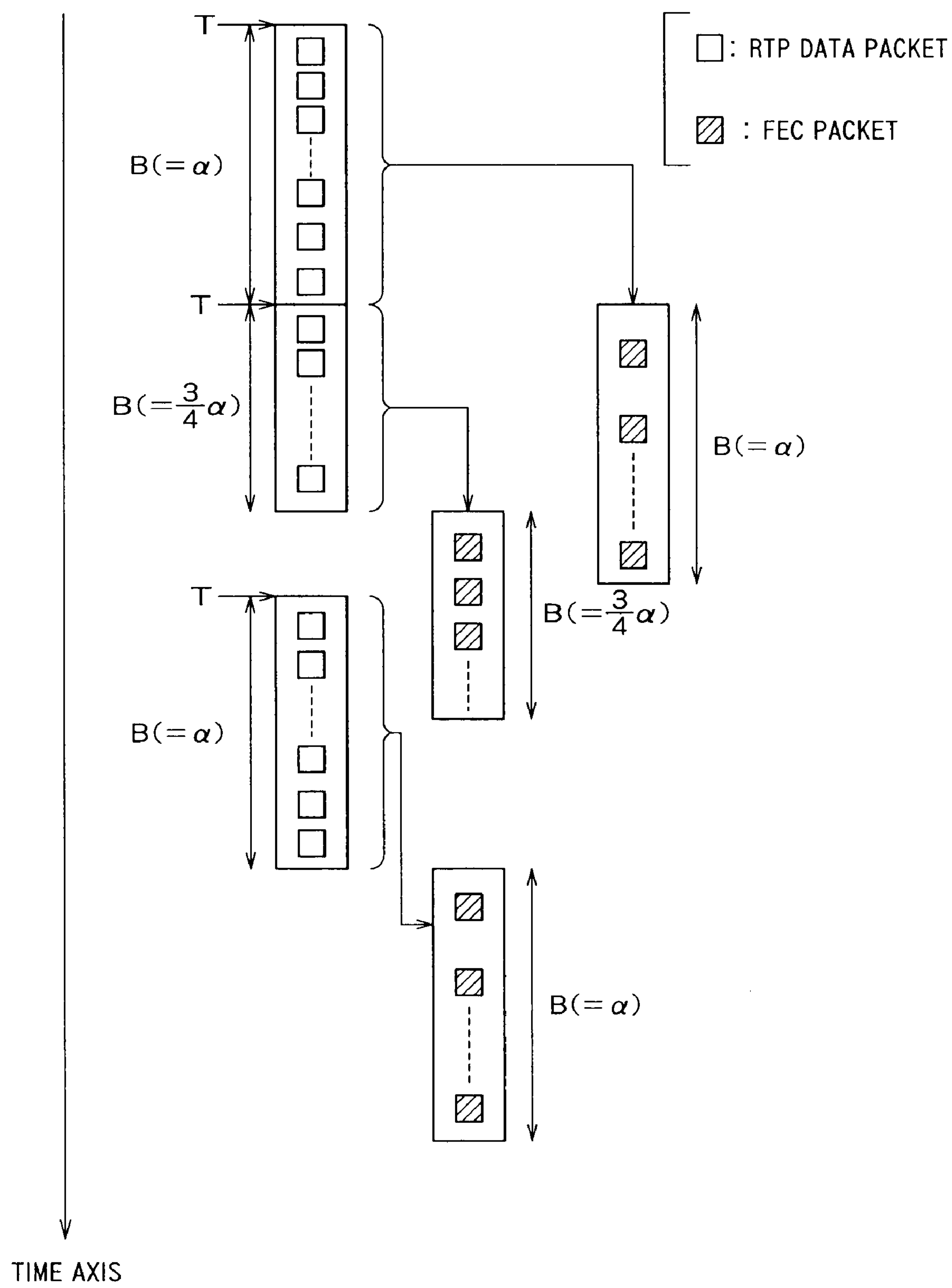
FIG. 7 shows how FEC packets are generated and transmitted by applying a second scheme according to the third embodiment.

FIG. 7 shows how FEC packets are generated and transmitted by applying this scheme. Here, an example is shown where since a maximum number of RTP data packets are acquired for $3\alpha/4(=\beta)$ which is shorter than the coding period $\alpha$ with respect to the second coding block from the top, FEC packets are generated from a maximum number of packets of RTP data at a time at which $3\alpha/4(=\beta)$ has elapsed from the calculation start time T, distributed within the coding period $\alpha$ from a time $(T+3\alpha/4)$, and FEC packets generated are transmitted.

According to this scheme, since the receiving side can perform FEC coding processing at early timing in addition to the effect of the first scheme, improvement of the recovery rate can be expected when a plurality of FEC coding processes are combined or the like.

Figure 8:
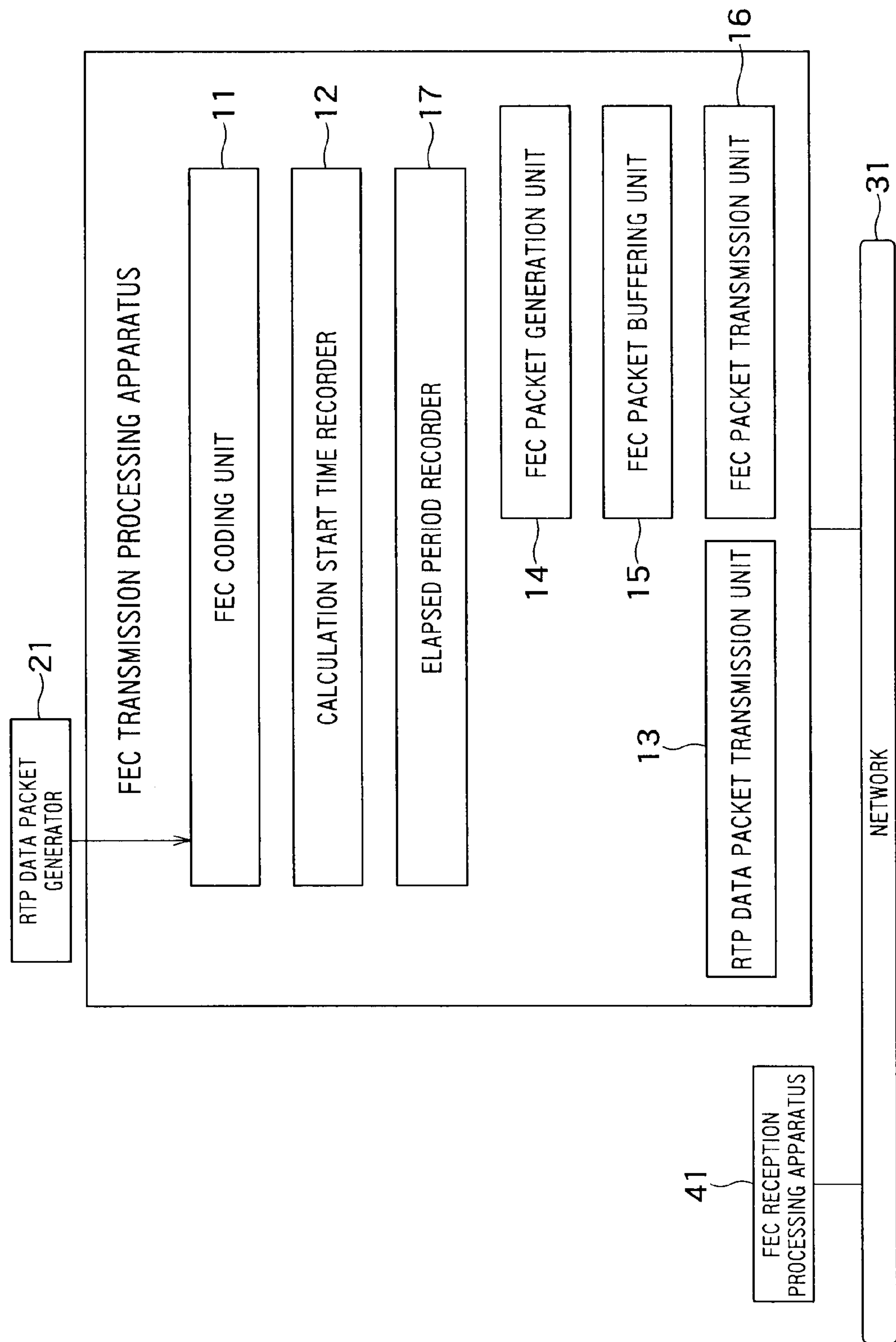
FIG. 8 is a block diagram showing the configuration of the FEC transmission processing apparatus according to the third embodiment.

Here, as the more specific configuration for realizing the first and second schemes, as shown in FIG. 8, an elapsed period recorder 17 for recording the elapsed period $\beta$ is added to the apparatus in FIG. 1. When coding processing on the maximum number of RTP data packets is completed or when the coding period $\alpha$ has elapsed, the elapsed period recorder 17 records the difference between the time of completion and the calculation start time T or the coding period $\alpha$ as the elapsed period $\beta$. The FEC packet transmission unit 16 calculates transmission timing using this elapsed period $\beta$ and carries out a transmission operation.

Figure 9:
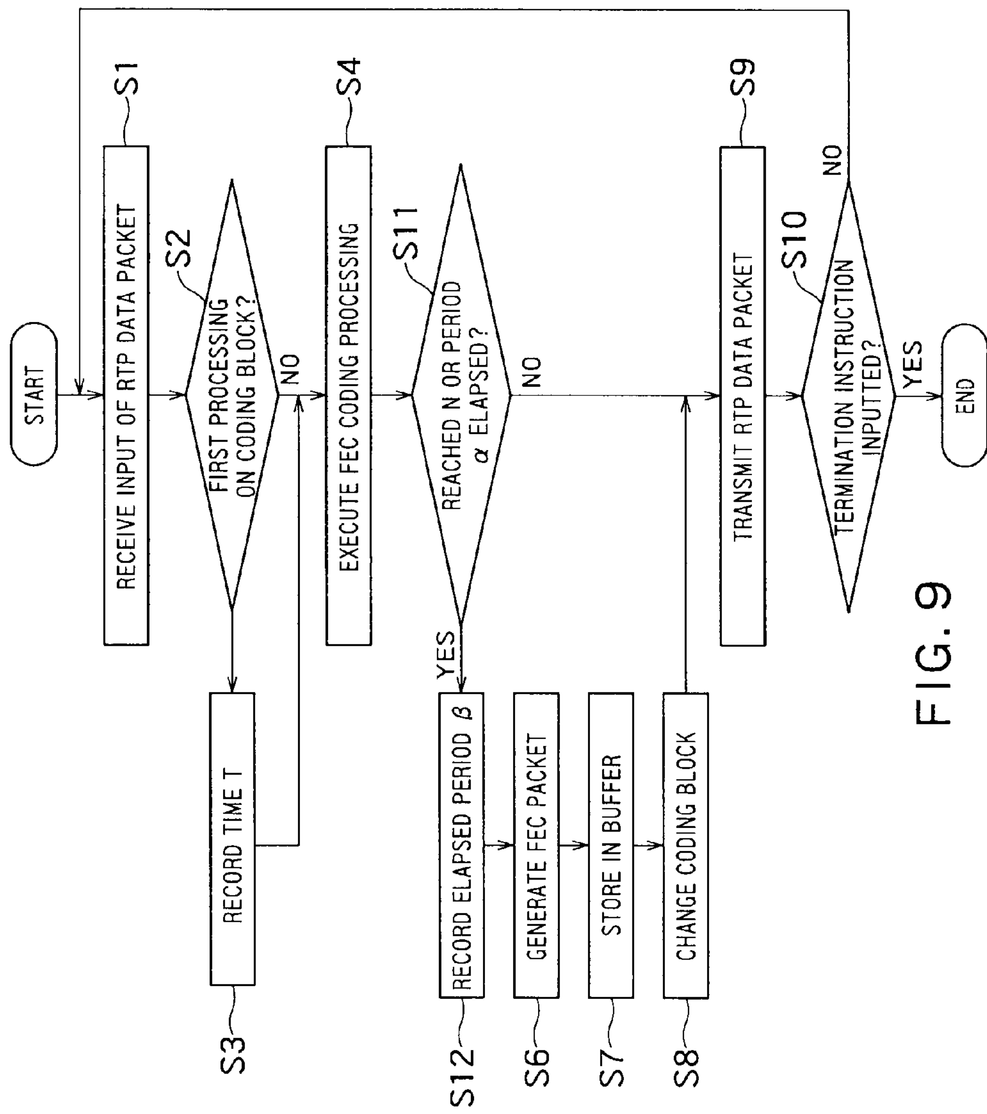
FIG. 9 is a flowchart showing an operation flow according to the third embodiment.

FIG. 9 is a flowchart showing an operation flow according to this embodiment. Step S5 of the flowchart in FIG. 3 is replaced by step S11 and new step S12 is added. Hereinafter, only the difference from FIG. 3 will be explained.

In step S11, it is judged whether the number of inputted (or coded) RTP data packets of the corresponding coding block has reached a maximum number N or the coding period $\alpha$ has elapsed after the calculation start time T. When any one of the two holds (YES in S11), the elapsed period recorder 17 is caused to record the elapsed period $\beta$ from the start time T (S12). When none of them holds (NO in S11), the process moves to step S9.

The operation flow of the FEC packet transmission unit 16 is the same as that in FIG. 4, but the judgment on the transmission timing made in step S22 is different from that in the first embodiment. In this embodiment, the transmission timing is determined as described above according to the scheme 1 or scheme 2.

(Fourth Embodiment)

Since the third embodiment transmits generated FEC packets by distributing them within the coding period $\alpha$ or elapsed period $\beta$ from the time calculated by adding the elapsed period $\beta$ to the above described calculation start time T, there are of course cases where a transmission period of FEC packets generated from a certain coding block overlaps a transmission period of FEC packets generated from the next coding block (see FIG. 6 and FIG. 7). In this case, the rate of the FEC packets temporarily increases on the network 31, causing trouble in transmission on the network restricted with bandwidth reservations and preventing the reception apparatus from normally carrying out FEC coding processing.

On the other hand, the second embodiment sets the above described minimum coding period as the coding period $\alpha$ in correspondence with the maximum transmission rate (generation rate) of the RTP data packets, but in this case, when the transmission rate (generation rate) is a maximum or close to a maximum, there is no problem, whereas when the transmission rate (generation rate) is reduced, there is a problem that excessive coding processing is executed. That is, even when the transmission rate of RTP data packets is low, the FEC packets are always transmitted at the same rate as the maximum rate of the RTP data packet and the redundancy of the FEC calculation processing increases more than necessary. Furthermore, when the transmission rate of the RTP data packets decreases extremely, the transmission rate of the FEC packets temporarily increases, causing trouble in operation on the network 31 where bandwidth reservations are made.

In digital broadcasting, especially ISDB-T, for example, an average rate of data packets varies a great deal due to contents of a program, contents of data broadcasting or as a result of mixed operation or the like. In this case, if the same coding period as that at a large rate is simply applied to data transmitted at a small rate, the proportion of FEC packets in data packets, that is, redundancy increases more than necessary, which results in poor efficiency and prevents effective use of bandwidth. Furthermore, streams with higher rates such as digital cinema are appearing, but transmission at a maximum rate may not always be necessary in this case. In this case, the rate may increase extremely temporarily, which is not observed with current encoders, but it is also necessary to consider such an operation that the rate is normally fixed to a certain rate.

This embodiment solves such problems that may occur in the second and third embodiments. While this embodiment is the same as the second and third embodiments in generation of FEC packets, it is different from these embodiments in times of transmission of FEC packets (transmission timing).

That is, as in the case of the second and third embodiments, when a maximum number of RTP data packets are acquired within the coding period $\alpha$, this embodiment generates FEC packets from the acquired maximum number of RTP data packets at the time of acquisition (without waiting for a lapse of the coding period $\alpha$). Furthermore, when the maximum number of RTP data packets are not acquired within the coding period $\alpha$, FEC packets are generated from the RTP data packets acquired within the coding period $\alpha$. However, this embodiment transmits FEC packets by distributing them within the elapsed period $\beta$ after the time calculated by adding the coding period $\alpha$ to the calculation start time T. Therefore, transmission timing is determined, for example, as follows.

The transmission timing is determined as the calculation start time T+coding period $\alpha$+elapsed period $\beta\times$(the number of packets from the start in the corresponding coding block/total number of packets in the corresponding coding block). Alternatively, transmission is performed at predetermined fixed timing from the start time T+coding period $\alpha$ for the elapsed period $\beta$.

Figure 10:
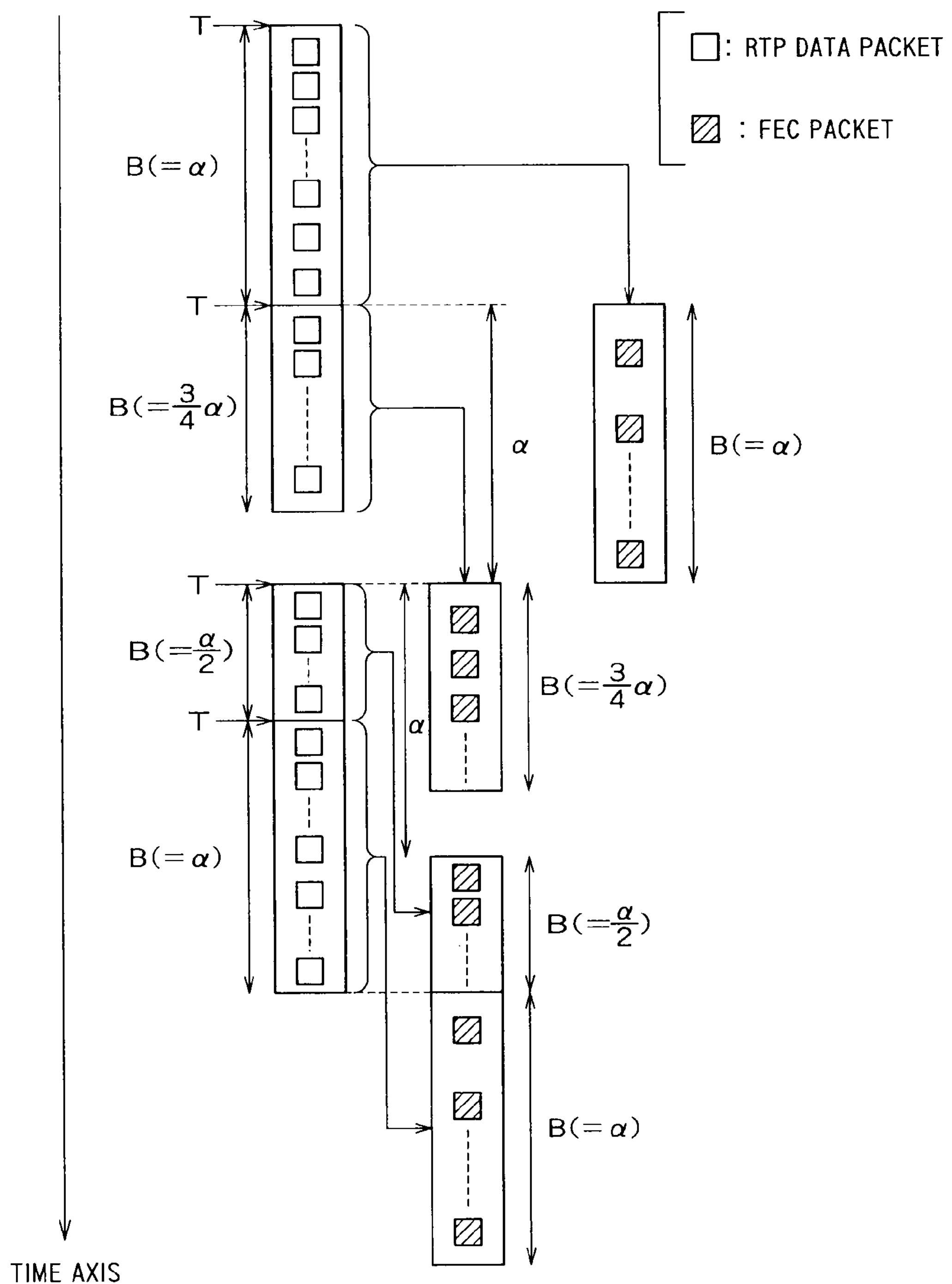
FIG. 10 shows how FEC packets are generated and transmitted according to a fourth embodiment.

FIG. 10 shows how FEC packets are generated and transmitted according to this embodiment. As is clear from a comparison between FIG. 6 and FIG. 7, after waiting for the coding period $\alpha$ from the calculation start time T, FEC packets are transmitted within the elapsed period $\beta$, and therefore transmission periods of FEC packets generated from each coding block never overlap with each other. Therefore, the rates of FEC packets never increase temporarily to cause trouble with transmission on the network restricted with bandwidth reservations either. Furthermore, setting an appropriate value as the coding period $\alpha$ (value greater than the minimum coding period in the second embodiment) also eliminates the problem that the transmission rates of FEC packets increase unexpectedly and enables effective use of bandwidth. This further improves the efficiency of utilization of communication bandwidth in an operation whereby bandwidth reservations are made but unoccupied bandwidth can be used for other communications. Furthermore, it is possible to suppress redundancy of FEC processing to a necessary amount, solve the problem that transmission rates increase temporarily more than expected and realize effective use of bandwidth.

The block diagram of this embodiment is the same as that in FIG. 8 used in the third embodiment and the operation flow is also the same as that in FIG. 9 and FIG. 4 used in the third embodiment, but this embodiment is different from the third embodiment only in the judgment of transmission timing made in step S22 in FIG. 4 and the judgment of transmission timing is made according to the above described expression.

This FEC transmission processing apparatus may also be implemented by using, for example, a general-purpose computer as basic hardware. That is, the FEC coding unit 11, calculation start time recorder 12, elapsed period recorder 17, FEC packet generation unit 14, FEC packet buffering unit 15, FEC packet transmission unit 16 and RTP data packet transmission unit 13 can be realized by causing a processor mounted in the above described computer to execute a program. In this case, the FEC transmission processing apparatus may also be realized by installing the above described program in the computer beforehand or by storing the program in a storage medium (program recording medium) such as a CD-ROM or distributing the program over a network and installing the program in a computer as appropriate.

What is claimed is:

1. An FEC transmission processing apparatus comprising:

a connecting unit configured to connect to a media packet generator that generates media packets;

a media packet acquiring unit configured to successively acquire the media packets from the media packet generator;

a media packet transmission unit configured to transmit the media packets acquired by the media packet acquiring unit to a media packet reception processing apparatus over a network, the media packet reception processing apparatus receiving and processing the media packets;

an FEC packet generation unit configured to carry out FEC calculation processing using media packets acquired within a first period of a predetermined time length after a first media packet is acquired to thereby generate a plurality of FEC packets, the FEC packets being used for the media packet reception processing apparatus to recover a lost media packet and the first media packet being a media packet acquired first among the media packets subjected to the FEC calculation processing; and an FEC packet transmission unit configured to transmit the FEC packets to the media packet reception processing apparatus in a second period of the predetermined time length after the first time period passes.

2. The apparatus according to claim 1, wherein the predetermined time length is a time length required to acquire a maximum number of media packets that can be subjected to the FEC calculation processing when the media packets are transmitted at a maximum rate.

3. The apparatus according to claim 1, wherein the FEC packet generation unit performs the FEC calculation processing based on a specified number of media packets when the specified number of media packets are acquired before the first period passes, and the FEC packet transmission unit transmits FEC packets generated through the FEC calculation processing in a third period of the predetermined time length after the specified number of media packets are acquired.

4. The apparatus according to claim 1, wherein the FEC packet generation unit performs the FEC calculation processing based on a specified number of media packets when the specified number of media packets are acquired before the first period passes, and the FEC packet transmission unit transmits FEC packets generated through the FEC calculation processing in a fourth period of time length required to acquire the specified number of media packets, after the specified number of media packets is acquired.

5. The apparatus according to claim 1, wherein the FEC packet generation unit performs the FEC calculation processing based on a specified number of media packets when the specified number of media packets are acquired before the first period passes, and the FEC packet transmission unit transmits FEC packets generated through the FEC calculation processing in a fifth period of time length required to acquire the specified number of media packets, after the first period passes.

6. The according to claim 3, wherein the specified number of media packets is a maximum number of media packets that can be subjected to the FEC calculation processing.

7. An FEC transmission processing method comprising:

connecting to a media packet generator that generates media packets;

acquiring the media packets from the media packet generator successively;

transmitting the media packets to a media packet reception processing apparatus that receives and processes the media packets over a network;

carrying out FEC calculation processing using media packets acquired within a first period of a predetermined time length after a first media packet is acquired to thereby generate a plurality of FEC packets, the FEC packets being used for the media packet reception processing apparatus to recover a lost media packet and the first media packet being a media packet acquired first among the media packets subjected to the FEC calculation processing; and transmitting the FEC packets to the media packet reception processing apparatus in a second period of the predetermined time length after the first time period passes.

8. A non-transitory computer readable medium storing a computer program for causing a computer to execute instructions to perform:

connecting to a media packet generator that generates media packets;

acquiring the media packets from the media packet generator successively;

transmitting the media packets to a media packet reception processing apparatus that receives and processes the media packets over a network;

carrying out FEC calculation processing using media packets acquired within a first period of a predetermined time length after a first media packet is acquired to thereby generate a plurality of FEC packets, the FEC packets being used for the media packet reception processing apparatus to recover a lost media packet and the first media packet being a media packet acquired first among the media packets subjected to the FEC calculation processing; and transmitting the FEC packets to the media packet reception processing apparatus in a second period of the predetermined time length after the first time period passes.

* * * * *